United States Patent [19]
Fourie et al.

[11] Patent Number: 5,875,672
[45] Date of Patent: *Mar. 2, 1999

[54] METHOD AND APPARATUS FOR MANUFACTURING METALLIC SUPPORT BEAMS FOR WINDSCREEN WIPER BLADE ASSEMBLIES

[76] Inventors: Eugene Fourie, 57 Herbert Baker Drive, Groenkloof; Mechiel Nicolaas Nieuwoudt, 246 Rosalind Avenue, Murrayfield; Johannes Hendrik Fehrsen, 20A Meyer Street, Oakland, Johannesburg, all of South Africa

[ * ] Notice: This patent issued on a continued prosecution application filed under 37 CFR 1.53(d), and is subject to the twenty year patent term provisions of 35 U.S.C. 154(a)(2).

[ * ] Notice: The term of this patent shall not extend beyond the expiration date of Pat. No. 5,590,556.

[21] Appl. No.: 777,016

[22] Filed: Jan. 7, 1997

Related U.S. Application Data

[63] Continuation-in-part of Ser. No. 189,704, Feb. 1, 1994, Pat. No. 5,590,556.

[30] Foreign Application Priority Data

Feb. 11, 1993 [ZA] South Africa ............................ 93/0952

[51] Int. Cl.$^6$ ........................... B21B 31/07; B21B 31/20; B21B 37/00
[52] U.S. Cl. ................................. 72/240; 72/10.7; 72/11.8
[58] Field of Search ................................. 72/240, 8.4, 9.2, 72/10.7, 11.8, 12.8, 16.4, 16.9, 19.7, 203, 237, 248; 83/407, 408

[56] References Cited

U.S. PATENT DOCUMENTS

| | | |
|---|---|---|
| 1,590,854 | 6/1926 | Rothera . |
| 1,652,860 | 12/1927 | Heinle . |
| 2,653,247 | 9/1953 | Lundahl . |
| 3,190,098 | 6/1965 | Wilson . |
| 3,728,924 | 4/1973 | Wutke . |

(List continued on next page.)

FOREIGN PATENT DOCUMENTS

| | | |
|---|---|---|
| 1180375 | 6/1959 | France . |
| 2193680 | 2/1974 | Germany . |
| 564068 | 8/1977 | Russian Federation . |
| 1389626 | 4/1975 | United Kingdom . |
| 1427440 | 3/1976 | United Kingdom . |
| 94/17932 | 8/1994 | WIPO . |

OTHER PUBLICATIONS

Patent abstract of Japan vol. 7, No.41 (M194) 18 Feb. 1983 & JP A 57 190703 (SASAKI) 24 Nov. 1982.
Patent Abstract of Japan vol. 8, No. 104 (M296) 16 May 1984 & JP A 59 016604 (Kawasaki) 27 Jan. 1984.
Patent Abstract of Japan vol. 12, No. 257 (M719) 20 Jul. 1988 & JP A 53 040 604 (SUMITOMO) 22 Feb. 1988.
Patent Abstract of Japan vol. 9, No. 111 (M–379) 15 May 1985 & JP A 59 232 606 (KAWASAKI) 27 Dec. 1984.

*Primary Examiner*—Joseph J. Hail, lll
*Assistant Examiner*—Rodney Butler
*Attorney, Agent, or Firm*—Pillsbury Madison & Sutro, LLP

[57] ABSTRACT

A method and apparatus for manufacturing metallic support beams for windscreen wiper blade assemblies, which includes a supply of metallic strip feedstock in a cold condition, the feedstock being passed in a cold condition through a pair of opposed, spaced apart, cold forming rollers. A spacing between the cold forming rollers is cyclically varied during to cyclically vary a thickness reduction of the feedstock and provide a rolled strip with a cyclically varying thickness. The thickness of the rolled strip is varied in a single pass between the cold forming rollers and the feedstock is worked so that the thickness of the rolled strip varies cyclically along its length in a ratio of least 2:1. Support beams are produced from the rolled strip, each support beam having a thickness which varies along its length.

18 Claims, 2 Drawing Sheets

U.S. PATENT DOCUMENTS

| | | |
|---|---|---|
| 3,760,621 | 9/1973 | Fujii . |
| 3,946,587 | 3/1976 | Maltby . |
| 4,215,558 | 8/1980 | Shiguma . |
| 4,248,072 | 2/1981 | Hasegawa . |
| 4,265,152 | 5/1981 | Corradi . |
| 4,785,653 | 11/1988 | Danielsson . |
| 4,836,774 | 6/1989 | Harada . |
| 4,949,099 | 8/1990 | Wilson . |
| 5,590,556 | 1/1997 | Fourie et al. . |

METHOD AND APPARATUS FOR MANUFACTURING METALLIC SUPPORT BEAMS FOR WINDSCREEN WIPER BLADE ASSEMBLIES

This application is a continuation-in-part of application Ser. No. 08/189,704, filed Feb. 1, 1994.

BACKGROUND OF THE INVENTION

THIS INVENTION relates to a method and apparatus for manufacturing support beams for windscreen wiper blade assemblies.

SUMMARY OF THE INVENTION

According to a first aspect of the invention there is provided a method of manufacturing metallic support beams for windscreen wiper blade assemblies, which includes providing a supply of metallic strip feedstock in a cold condition; passing the feedstock in a cold condition through a pair of opposed, spaced apart, cold forming rollers; cyclically varying a spacing between the cold forming rollers during operation, thereby to vary cyclically a thickness reduction of the feedstock and provide rolled strip with a cyclically varying thickness, the thickness of the rolled strip being varied in a single pass between the cold forming rollers and the feedstock being worked so that the thickness of the rolled strip varies cyclically along its length in a ratio of at least 2:1; and producing support beams from the rolled strip, each support beam having a thickness which varies along its length.

The method may include the steps of measuring the thickness of the rolled strip issuing from the cold forming rollers and controlling the spacing between the cold forming rollers in a feedback manner, in response to the measured thickness.

It will be appreciated by those skilled in the art that the term "cold condition" will refer to a temperature which will vary from metal to metal. Thus, for example, if the feedstock is steel, it may be supplied to the rollers at a temperature of below 900° C. Preferably, steel feedstock may be supplied at a temperature of between 20° C. and 100° C.

The rotational axis of one of the rollers may be kept fixed while a rotational axis of the other cold forming roller may be varied relative thereto in order to vary the spacing between the two cold forming rollers. Instead, the position of both rotational axes may be varied.

In the event that the rotational axis of one cold forming roller is kept fixed and the rotational axis of the other cold forming roller is displaced back and forth, the moving axis may be displaced substantially perpendicularly to the direction of travel of the rolled strip through and between the cold forming rollers. If both rotational axes are displaced, they may both be displaced substantially perpendicularly to the direction of travel of the strip.

The rotational axes may be kept parallel to one another or they may be tilted with respect to one another. They are preferably kept parallel to one another.

The feedstock may be worked so that the thickness of the rolled strip varies in a ratio of at least 3:1.

The rotational speeds of the forming rollers may be substantially the same. It will be appreciated that, because the thickness of the rolled strip is varied, the speed at which the rolled strip exits from the forming rollers will be different from the speed at which it enters the forming rollers. The rotational speed of the forming rollers may be varied so as to obtain a substantially constant output speed.

The speeds of the forming rollers may also be varied with respect to each other to impart a curvature along the rolled strip.

The method may include cutting the rolled strip longitudinally on both sides to vary its width along its length. The thickness of the longitudinally cut strip may be measured and the width of the strip cut being varied in a feedback manner as a result of the measurement obtained.

The rolled strip may be cut transversely into lengths with each length having the same variation in thickness and width along its length.

Further according to a second aspect of the invention, there is provided an apparatus for manufacturing metallic support beams for windscreen wiper blade assemblies, which includes a supply means for providing a supply of metallic feedstock in a cold condition; a pair of opposed, spaced apart, cold forming rollers for working the feedstock continuously from the supply means a cold condition; a separation varying means for cyclically varying a spacing between the cold forming rollers during operation over a range sufficient to vary cyclically a thickness reduction of the feedstock so as to provide rolled strip with a thickness which varies cyclically along its length in a ratio of at least 2:1, the rollers being rotatable in a single direction so that the feedstock is worked and the strip rolled in a single pass; and a means for producing support beams, each of varying thickness, from the rolled strip.

A rotational axis of one of the cold forming rollers may be fixed while the position of a rotational axis of the other cold forming roller relative thereto may be variable so that the spacing between the two forming rollers is varied, in use.

The apparatus may include a suitable drive means for rotatably driving each cold forming roller independently.

The apparatus may further include a measuring means for measuring the thickness of rolled strip issuing from the cold forming rollers and a feedback control means for controlling the spacing between the rollers in a feedback manner, in response to the measuring means.

A longitudinal cutting means may be provided for cutting the rolled strip longitudinally on both sides so that its width varies along its length, to provide rolled strip with a varying thickness and width. A measuring means may be provided to measure the width of the rolled strip and a feedback control means may be operably connected to the measuring means to control the operation of the longitudinal cutting means in a feedback manner.

The apparatus may include a transverse cutting means for cutting the formed strip into lengths with each length having the same variation in thickness and width along its length.

Other objects, features, and characteristics of the present invention, as well as the methods of operation and functions of the related elements of the structure, and the combination of parts and economies of manufacture, will become apparent upon consideration of the following description and the appended claims with reference to the accompanying drawings, all of which form a part of this specification.

BRIEF DESCRIPTION OF THE DRAWINGS

The invention is now described, by way of examples, with reference to the accompanying drawings in which.

DETAILED DESCRIPTION OF THE PRESENTLY PREFERRED EXEMPLARY EMBODIMENTS

Figure 1:
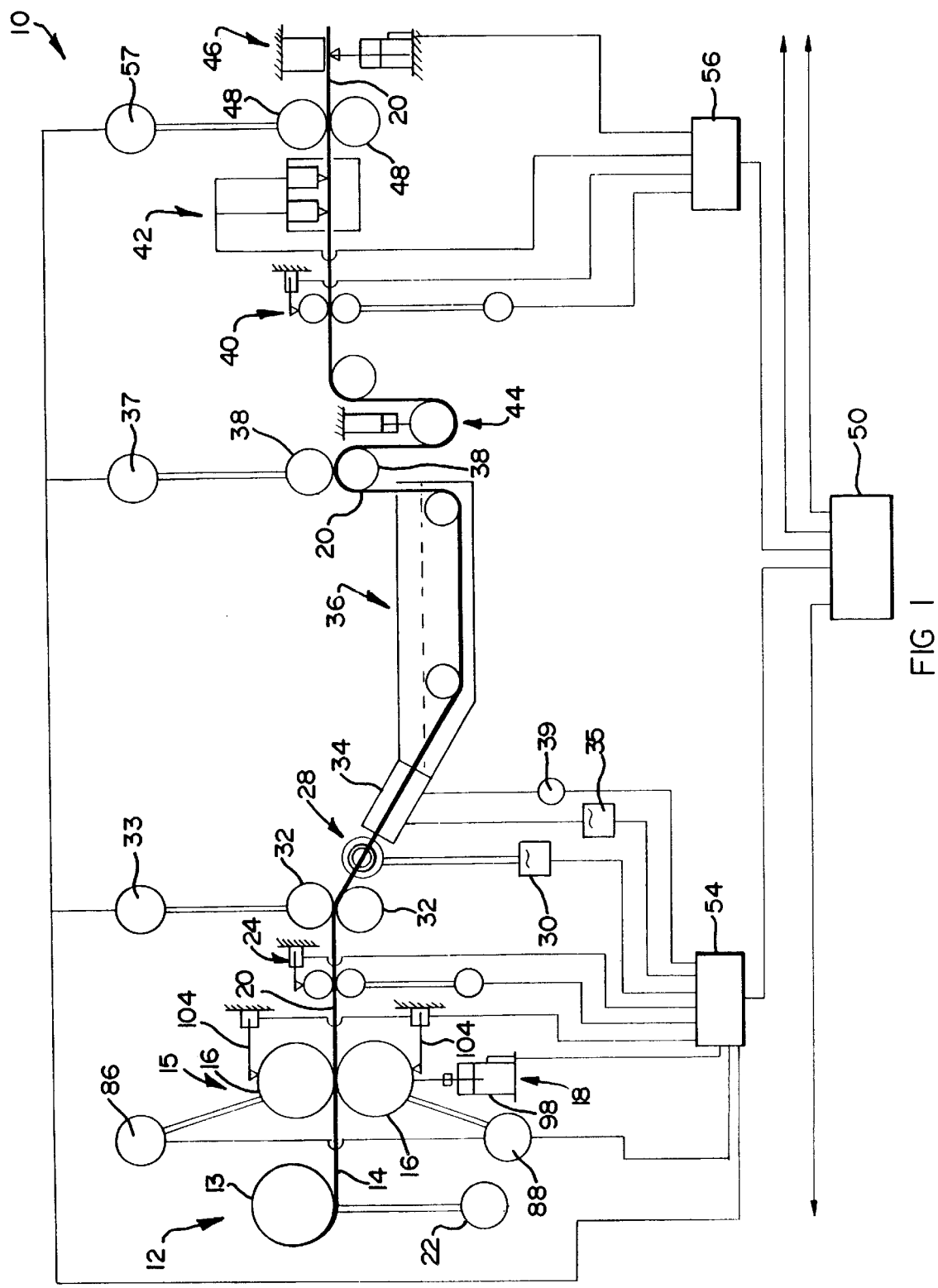
FIG. 1 shows a schematic diagram of an apparatus, in accordance with the invention, for manufacturing support beams with a varying thickness.

In FIG. 1 reference numeral 10 generally indicates an apparatus for manufacturing metallic support beams with a cyclically varying thickness in accordance with the invention.

The apparatus 10 includes a supply means 12 for providing a supply of elongate mild steel feedstock 14 which has a constant thickness and width and is strip-like. A typical material would be an SAE 1055 medium carbon steel, or other low alloy steels in the medium carbon range. The material used is normally in a fully annealed condition, as the applicant believes that this prevents edge cracking of a rolled strip 20. The feedstock 14 has a width of 13 mm and a thickness of 1.4 mm. Feedstock with a width of 16 mm and a thickness of 1.4 mm may also be used. The thickness of the feedstock will be below 3 mm. The supply means 12 includes a rotatable coil 13 of the feedstock 14. The coil 13 is operatively connected to an input speed varying means 22. The rolling mill assembly 15 including a pair of opposed forming rollers 16 is provided for working the feedstock 14 in a cold condition. A separation varying means 18 is also provided for varying the separation of the forming rollers 16, during operation, thereby to provide the rolled strip 20 with a varying thickness. The thickness of the strip 20 varies between 1.29 mm and 0.30 mm. The rollers 16 are smooth and circular cylindrical in their operative regions. The diameter of the rollers 16 is between 85 and 95 mm to allow for wear of the rollers.

The input speed varying means 22 varies the rate at which the feedstock 14 is supplied to the forming rollers 16 to control the tension in the feedstock 14, in use.

The apparatus 10 further includes a measuring means 24 for measuring the thickness of the formed strip 20 exiting from the forming rollers 16. The measuring means 24 is connected to a control means 54. The control means 54 controls the separation of the rollers 16 in a feedback manner, in response to signals received from the measuring means 24. For this purpose a pair of sensors 104 measures the distance between the rollers 16. The separation varying means 18 is in the form of a hydraulic cylinder and piston rod arrangement. A piston rod 98 of the arrangement forming part of the separation varying means 18, is connected to the lower roller 16 to apply force via the rollers 16 on the feedstock 14. The force exerted is that required to reduce the strip as described and varies in accordance with the material of the strip. Typically, the force is between 176 kN and 265 kN. The piston rod 98 is connected to, and is responsive to, signals received from the control means 54.

The speed of rotation of the rollers 16 may be such as to provide a circumferential speed below 20 meters/minute and preferably of about 7 meters/minute.

A heating station 28 is provided for heating the strip 20 in a continuous manner to a temperature of about 740° C., once the strip 20 has emerged from the measuring means 24. Hence, a variable power supply 30 is provided for supplying power to the heating station 28 in accordance with the thickness of the strip 20 passing therethrough. The heating station 28 is in the form of an induction heater. Thus, the energy supplied by the power supply 30, in use, to the induction heater 28 is varied by varying the output from the power supply 30. The output of the power supply 30 is in the region of about 10 kW. The power supply 30 is connected to the control means 54 to be responsive to signals emanating therefrom.

A pair of pull rollers 32 is arranged between the measuring means 24 and the heating station 28. The strip 20 is pulled through the rollers 32. Rotation of the rollers 32 is controlled by a motor 33, the motor 33 also being connected to the control means 54.

A heat soak 34 is provided in combination with a recrystallization station 36 which heat treats the strip 20. The strip 20 is heated to a temperature of about 740° C. As with the power supply 30, the heat soak 34 is also connected to the control means 54 to be responsive to signals emanating therefrom. The power supplied to the heat soak 34 varies and is controlled by a power adjustment device 35 and a temperature controller 39.

A further pair of pull rollers 38 is provided for drawing the strip 20 from the recrystallization station 36 to a strip tensioning device 44. The strip tensioning device 44 maintains the tension in the strip 20. Once again, rotation of the rollers 38 is controlled by a motor 37, the motor 37 being connected to the control means 54.

A further measuring means 40 is provided to measure the thickness of the strip 20 after it has emerged from the tensioning device 39. A laser operable width cutting means 42 is arranged downstream of the measuring means 40 to cut the strip 20 longitudinally to obtain the desired width profile of the strip 20. The measuring means 40 is connected to the width cutting means 42 via a width cutting and length cutting control means 56 which controls the width to which the strip 20 is cut.

A length cutting unit 46 is provided downstream of the laser cutting means 42 to cut the strip 20 into desired lengths. Yet a further pair of pull rollers 48 is provided between the laser cutting means 42 and the cutting unit 46. The cutting unit 46 is also connected to the control means 56. Rotation of the further pair of rollers 48 is controlled by a motor 57, the motor 57 being connected to the control means 54.

A system control means 50 is provided to control the operation of the apparatus 10. The system control means 50 is connected to the control means 54 and the width cutting and length cutting control means 56.

In use, the feedstock 14 is decoiled from the coil 13 and is drawn towards the rolling mill assembly 15. The tension within the feedstock 14 is controlled by the control means 54. The forming rollers 16 "cold work" the feedstock 14 to vary the thickness of the feedstock 14 in a predetermined manner, and provide the formed strip 20. The strip 20 passes through the measuring means 24 which measures the thickness of the strip 20. By means of the control means 54, the piston rod 98 is utilized to vary continuously and cyclically the distance between the rollers 16 and thereby to control the thickness of the strip 20. The feedstock 14 is supplied to the rollers at a temperature of less than 900° C. and preferably at about 25° C.

Hereafter, the strip 20 passes into the pair of pull rollers 32 which direct the strip 20 into the induction heater 28. The speed of the pull rollers 32 is controlled by the control means 54. The induction heater is energized by means of the variable power supply 30 in dependence of the thickness of the strip 20. This process is governed by the control means 54 which receives signals from the measuring means 24 and transmits suitable signals to the power supply 30. The strip 20 is heated to a temperature of about 740° C.

The strip 20 then enters the heat soak 34 and thereafter, the recrystallization station 36. The induction heater 28, the heat soak 34 and the recrystallization station 36 together serve to heat treat the strip 20. The operation of the heat soak 34 is also governed by the control means 54.

The pull rollers 38 draw the strip 20 from the recrystallization station 36 to the further measuring means 40 via the tensioning device 44 which maintains the required tension in the strip 20. The speed of the pull rollers is governed by the control means 54 and by the motor 37.

Hereafter, the strip 20 passes through the further measuring means 40 which feeds data to the laser cutting means 42 via the width cutting and length cutting control means 56 in order that the strip 20 may be cut to the required width which varies in a predetermined manner. The pull rollers 48 feed the strip 20 at a speed governed by the control means 54 from the laser cutting means 42 to the length cutting unit 46 which is also controlled by the width cutting and length cutting control means 56 to cut the strip 20 into the required lengths of 450 mm each. Each length has the same thickness and width profile and is intended to be a support beam for a windscreen wiper. It will thus be appreciated that the thickness and width of the strip 20 varies in a cyclical manner along its length.

The dimensions of each length are as follows:
length=450 mm
thickness at the center of each length=1.29 mm
thickness at the ends of each length=0.30 mm
width at the center=11 mm; and
width at the ends=6 mm Each length tapers uniformly and continuously in both thickness and width in a straight line manner from its center to its ends.

Figure 2:
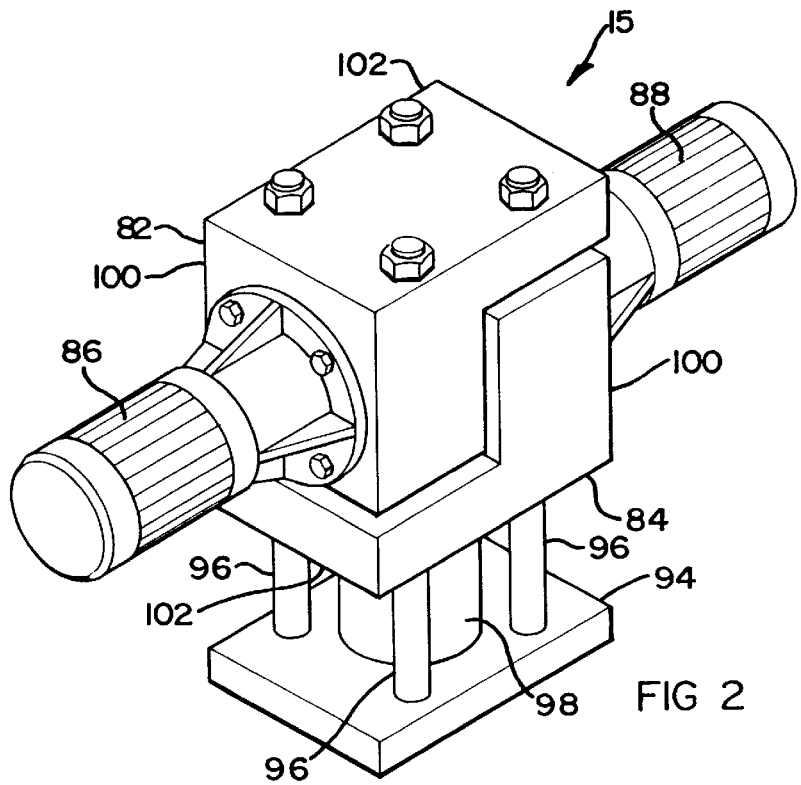
FIG. 2 shows a three-dimensional view of a rolling mill assembly for use in the apparatus.
Figure 3:
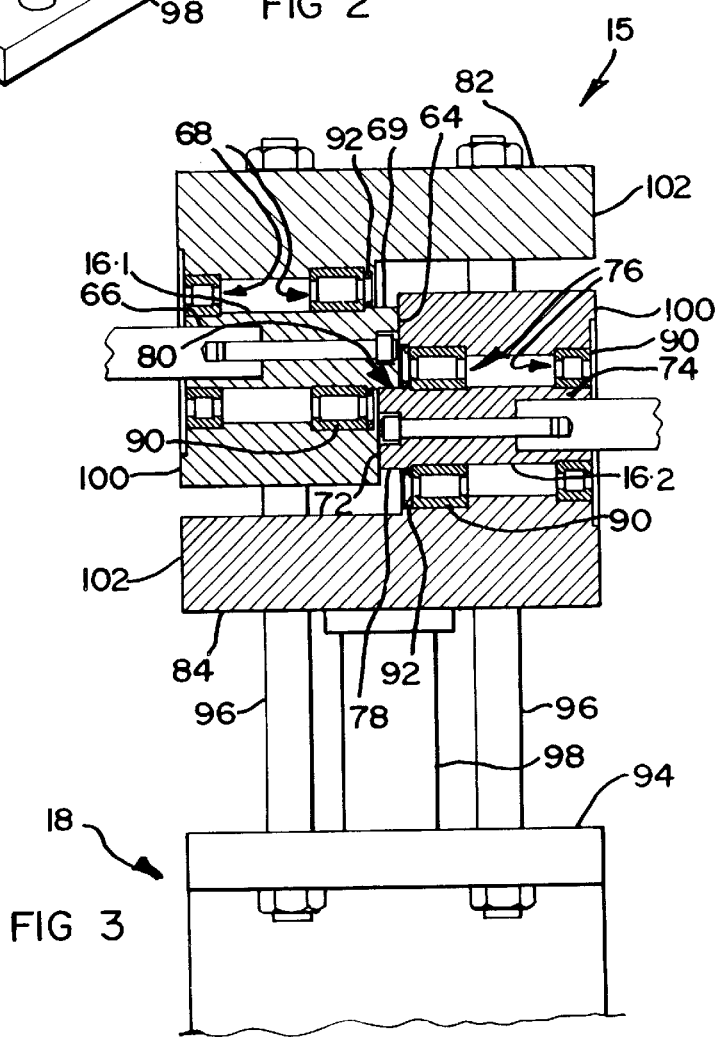
FIG. 3 shows a part-sectional front view of the rolling mill assembly.

Referring now to FIGS. 2 and 3 of the drawings, the rolling mill assembly 15 is shown.

The rolling mill assembly 15 includes a first forming roller 16.1 which is rotatable about a first rotational axis and has a first end 64 and a second end 66. A pair of cylindrical roller bearings 68 rotatably support the first roller 16.1. The bearings 68 are located between the first and second ends 64, 66 of the roller 16.1 to provide an exposed end portion 69 of the first roller 16.1 at its first end 64.

A second forming roller 16.2 is provided having a first end 72 and a second end 74, the roller 16.2 being rotatably about a second rotational axis. A pair of cylindrical roller bearings 76 rotatably supports the second roller 16.2. The bearings 76 are located between the first and second ends 72, 74 of the second roller 16.2 to provide an exposed end portion 78 of the second roller 16.2 at its first end 72. The rollers 16.1, 16.2 extend in opposite directions with their exposed end portions 69, 78 overlapping and being spaced apart to define a rolling region 80 between them. The end portions 69, 78 are smooth and circular cylindrical.

The first roller 16.1 is rotatably mounted, via the bearings 68, in a first carrier 82 and the second roller 16.2 is rotatably mounted, via the bearings 76, in a second carrier 84. The end portions 69, 78 of the rollers 16.1, 16.2 project from their carriers 82, 84 respectively and overlap one another.

The first roller 16.1 is driven by a drive means in the form of an electric motor 86. The motor 86 is connected to the first roller 16.1 at its second end 66. The second roller 16.2 has a similar electric motor 88 connected to its second end 74.

Axial shaft seals 92 are provided to minimize damage to the roller bearings 68 and 76 by the ingress of drift.

The first and second carrier 82, 84 are displaceable with respect to one another, thereby to vary the separation of the rollers 62, 70 at their end portions 69, 78, thereby varying the gap between them.

A support base 94 is provided on which the first carrier 82 is mounted. The first carrier 82 is fixedly mounted on the support base 94 by means of four slide columns 96 to which the first carrier 82 is fixed. The second carrier 84 is slidably mounted on the slide columns 96 and the piston rod 98 is fixed to the second carrier 84 to permit the second carrier 84 to be hydraulically displaced with respect to the first carrier 82.

Each carrier 82, 84 has a carrier portion 100 in which its respective roller 16.1, 16.2 is mounted, and a support portion 102 which extends beyond the first end 64, 72 of its respective roller 16.1, 16.2. In each carrier 82, 84 two of the slide columns 96 pass through the carrier portion 100 and the other two columns 96 pass through the support portion 102.

The first and second carriers 82, 84 are arranged in a complementary manner, such that the carrier portion 100 of the first carrier 82 is aligned with the support portion 102 of the second carrier 84 and vice versa.

By means of the invention an effective method and apparatus is provided for the production of metallic support beams for windscreen wiper blade assemblies.

This invention has been described with reference to what is currently considered to be the most practical and preferred embodiment. However, this is not meant to limit the present invention. Rather, various modifications and arrangements are intended to be included within the spirit and scope of the appended claims.

We claim:

1. A method of manufacturing metallic support beams for windscreen wiper blade assemblies, which includes:

providing a supply of metallic strip feedstock in a cold condition;

providing a pair of opposed, spaced apart, cold forming rollers, said pair of cold forming rollers being mounted so that a spacing therebetween can be varied in a controlled manner;

passing the feedstock in a cold condition through said pair of opposed, spaced apart, cold forming rollers so as to reduce a thickness of at least a portion of said feedstock;

cyclically varying a spacing between the cold forming rollers during said step of passing, thereby to cyclically vary a thickness reduction of the feedstock and form a rolled strip with a cyclically varying thickness, said spacing between said cold forming rollers being cyclically varied so that as a result of a single pass through said cold forming rollers, the thickness of said feedstock is cyclically reduced to form a rolled strip having a thickness that varies cyclically along its length in a ratio of at least 2:1; and producing support beams for windscreen wiper blade assemblies from the rolled strip, each support beam having a thickness which varies along its length.

2. The method as claimed in claim 1, including the steps of measuring the thickness of the rolled strip issuing from the cold forming rollers and feedback controlling the spacing between the cold forming rollers, in response to the measured thickness.

3. The method as claimed in claim 1, wherein feedstock is supplied to the rollers at a temperature of between 20° and 100° C.

4. The method as claimed in claim 1, wherein a rotational axis of one of the cold forming rollers is kept fixed while a rotational axis of the other cold forming roller is moved relative thereto thereby to vary the spacing between the two cold forming rollers.

5. The method as claimed in claim 1, wherein the feedstock is worked so that the thickness of the rolled strip varies cyclically in a ratio of at least 3:1.

6. The method as claimed in claim 1, wherein rotational speeds of the cold forming rollers are substantially the same.

7. The method as claimed in claim 1, which includes cutting the rolled strip longitudinally on both sides to vary its width along its length.

8. The method as claimed in claim 7, which includes measuring the thickness of the rolled strip and varying a cutting width in response thereto.

9. The method as claimed in claim 1, which includes the step of cutting the rolled strip transversely into lengths each having the same variation in thickness and width along its length.

10. An apparatus for manufacturing a support beam for windscreen wiper blade assemblies, which includes:

a metallic feedstock supply for providing a supply of metallic feedstock in a cold condition;

a pair of opposed, spaced apart, cold forming rollers for working the feedstock continuously from the supply in a cold condition so as to reduce a thickness of at least a portion of said feedstock;

structure for mounting said pair of forming rollers so that a spacing therebetween can be cyclically varied in a controlled manner;

a separation varying means for cyclically varying said spacing between the cold forming rollers as feedstock is passed therebetween so that as a result of a single pass through said cold forming rollers, the thickness of said feedstock is cyclically reduced to form a rolled strip having a thickness that varies cyclically along its length in a ratio of at least 2:1, the rollers being rotatable in a single direction so that the feedstock is worked and the strip rolled in said single pass; and means for producing support beams for windscreen wiper blade assemblies, each of varying thickness, from the rolled strip.

11. The apparatus as claimed in claim 10, wherein a rotational axis of one of the cold forming rollers is fixed while the position of a rotational axis of the other cold forming roller relative thereto is variable so that the spacing between the two cold forming rollers may be varied.

12. The apparatus as claimed in claim 10, including a drive means for rotatably driving each cold forming roller independently.

13. The apparatus as claimed in claim 10, including a first thickness measuring means for measuring the thickness of rolled strip issuing from the cold forming rollers and a feedback control means for controlling the spacing between the rollers in a feedback manner, in response to the first thickness measuring means.

14. The apparatus as claimed in claim 10, including a longitudinal cutting means for cutting the rolled strip longitudinally on both sides so that its width varies along its length, to provide rolled strip with a varying thickness and width.

15. The apparatus as claimed in claim 14, including a second thickness measuring means for measuring the thickness of the rolled strip and a control means responsive to the second thickness measuring means for controlling operation of the longitudinal cutting means.

16. The apparatus as claimed in claim 14, including a transverse cutting means for cutting the rolled strip into lengths each having the same variation in thickness and width along its length.

17. The apparatus as claimed in claim 10, wherein the separation varying means permits the spacing between the cold forming rollers to vary during operation over a range sufficient to vary the thickness reduction so that the thickness of the rolled strip varies cyclically in a ratio of at least 3:1 along its length.

18. The apparatus of claim 10, wherein feedstock is supplied to the rollers at a temperature of between 20° and 100° C.

* * * * *